United States Patent Office 3,470,646
Patented Oct. 7, 1969

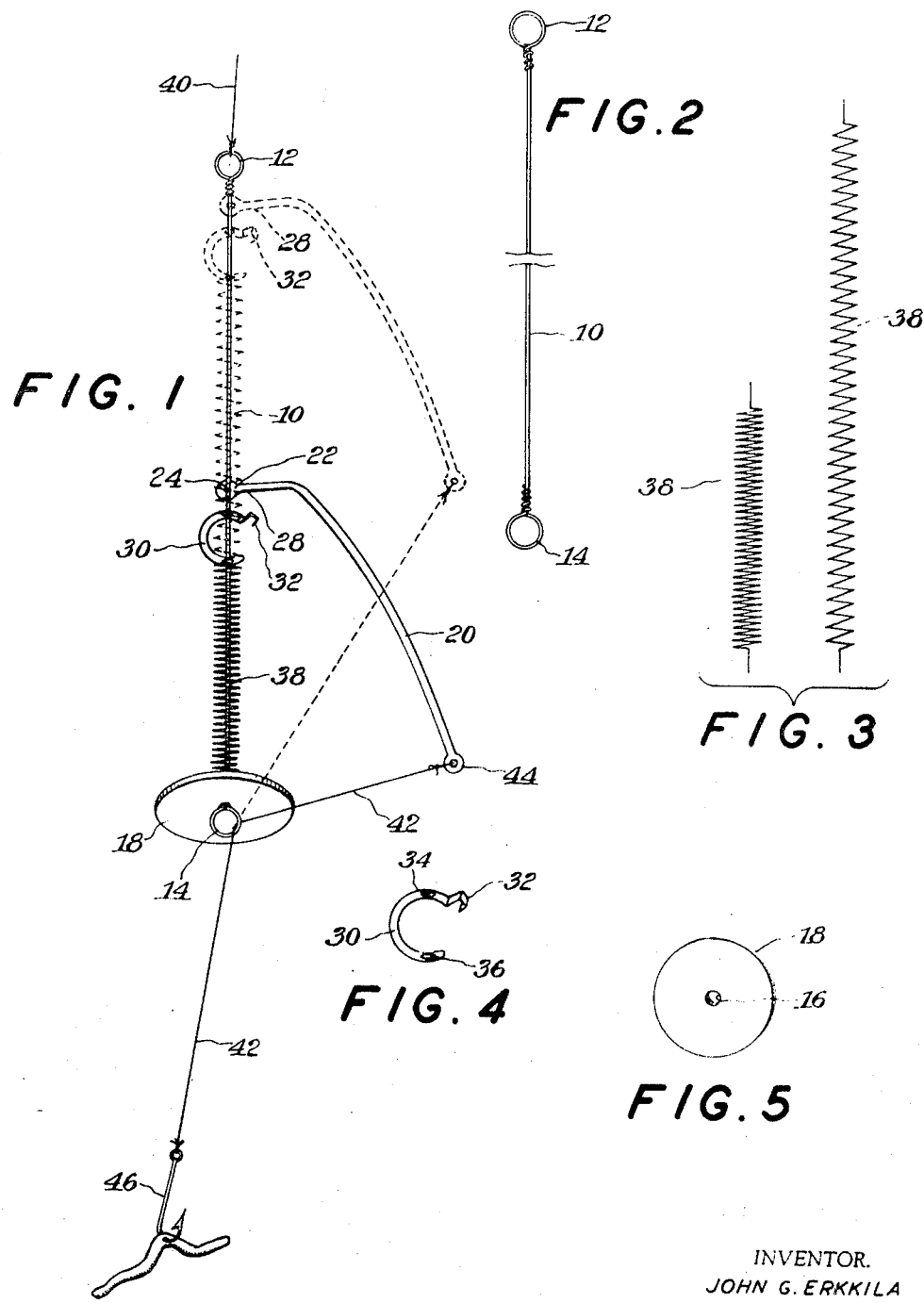

3,470,646
TRAP TYPE FISHHOOK DEVICE
John G. Erkkila, 5233 12th Ave. NE.,
Seattle, Wash. 98105
Filed Nov. 6, 1967, Ser. No. 680,699
Int. Cl. A01k 97/00
U.S. Cl. 43—15                                    2 Claims

ABSTRACT OF THE DISCLOSURE

A device to be connected with a fish line used in still fishing to set a hook in the mouth of a fish which strikes the hook including a coil spring on a guide wire arranged to be held compressed by releasable trip means and which will be released and exert an upward jerk on a hook carrying line when a fish strikes the hook to set the hook in the fish's mouth.

SUMMARY OF THE INVENTION

My device comprises a vertical length of wire having vertical loops at each end. The wire extends through a central hole in a horizontal disc which rests on top of the bottom loop. An elongated arm which extends outward and away from the wire has its upper end pivotally and slidably engaging the wire. A trigger slidably and pivotally engages the wire and is disposed adjacent but below the upper end of the arm. A compression coil spring is concentrically disposed about the wire, one end of the spring being disposed adjacent but below the trigger, the other end bing disposed adjacent but above the plate.

The trigger has a set position at which the spring is compressed, and the trigger and upper end of the arm are held midway between the loops. The trigger has a release position at which the spring is expanded and the trigger and the upper end of the arm are slid upwardly to the upper loop.

In use, the trigger is placed in the set position, the free end of a fishing line is secured to the upper loop, and a length of line is tied at one end to the lower end of the arm, passes through the lower loop and is secured at its other end to a fishhook. When a fish strikes the hook, the trigger is released, and the upward jerk of the arm pulls the hook so securely upward into the fish that it cannot escape.

BRIEF DESCRIPTION OF THE DRAWINGS

In the drawings:
FIG. 1 is a side view of my device;
FIG. 2 is a side view of the length of wire;
FIG. 3 shows in side view the spring in compressed and expanded position;
FIG. 4 is a perspective view of the trigger; and
FIG. 5 is a perspective view of the plate.

DETAILED DESCRIPTION OF PREFERRED EMBODIMENT

Referring now to FIGS. 1–5, a length of wire 10 terminates at opposite ends in upper and lower vertically disposed loops 12 and 14. Wire 10 extends through the center hole 16 of horizontal water reaction disc or plate 18, with this plate resting on top of loop 14.

An outwardly and downwardly inclined trip arm 20 has at its upper end 22 an opening 24 through which the wire extends, this opening being large enough to permit pivotal movement about and sliding movement along the wire of the arm. A part 28 of arm 20 adjoining end 22 extends outwardly in a generally transverse direction from wire 10.

A C shaped trigger member 30 has an adjustable extended portion 32 at one end with an upper opening 34 adjacent thereto and a lower opening 36 at the other end. Wire 10 extends through openings 34 and 36 whereby the member can be slid therealong or pivoted thereabout.

A compression spring 38 is concentrically disposed about the wire with the bottom end bearing against plate 18 and the upper end bearing against member 20. The lower end of a fishing line 40 is secured to loop 12. Another line 42 is secured to the bottom end 44 of arm 20 and extends through loop 14 to a downwardly disposed fishhook 46.

To set this device the trigger 30 is pressed downwardly so as to compress spring 38 and the part 28 of arm 20 is placed on the apex of adjustably extended portion 32 of trigger 30. Portion 32 is corrugated so its length can be adjusted by bending it to vary the distance from the wire 10 of the point of contact of portion 32 with the arm portion 28. The pressure of the compressed spring 38 is exerted through trigger 30 and portion 32 against arm part 28 outwardly from the wire 10 and will cause the opening 24 of portion 22 to bind onto wire 10 tight enough to hold the spring 38 compressed with the weight of the line 42 and baited hook 46 secured to the outer end of the arm and extended through loop 14. When a fish strikes the hook 46 the arm 20 will be moved toward spring 38. This will release the grip of arm part 22 on wire 10 and permit the expansion of spring 38 to jerk the hook 46 upwardly and set it in the mouth of the fish. It is apparent that if the upper line 40 is supported from a highly flexible pole the spring 38 could, in expanding, impart to the wire 10 a substantial amount of movement in a downward direction and in so doing lessen the amount of upward movement which would otherwise be imparted by the spring to the hook carrying parts and hook. Resistance of the fairly large disc or plate 18 to quick downward movement in the water will insure maximum upward movement of the hook carrying parts and hook when the spring expands thus increasing the hook setting efficiency of the device.

Having thus described my invention, I claim as new and desire to secure by Letters Patent:

1. In a fish hook setting device, a normally vertical wire having a loop at each end; a plate of substantial area supported on the loop at the lower end of said wire and positioned generally transverse to said wire; a coiled compression spring on said wire with its lower end resting against said plate; a trip arm having a part extending generally transverse to the wire and having a downwardly extending outwardly inclined part, said transverse part having an opening therein so that the trip arm can be slidably supported on the wire above the spring, said trip arm being angularly movable so that the edges of said opening are moved into binding engagement with said wire; a trigger member slidably mounted on the wire between the spring and the arm and having a part positioned outwardly from the wire adapted to engage the transverse part of the arm, said trigger member part engaging said arm when the spring is compressed to move the arm so as to bind said arm to said wire and maintain said spring under compression; and a hook-carrying line connected with the outer end of the downwardly inclined part of said trip arm and extended through the lower loop of the wire adapted when a pull is exerted thereon to move the arm and disengage the opening edges from binding engagement with the wire, whereby expansion of said spring will impart rapid upward movement to said arm and said hook-carrying line.

2. The fish hook setting device as claimed in claim 1 in which the trigger member is of C-shape and has perforations near its respective ends through which the wire extends and in which the arm-engaging part is an extension on the upper end portion of said trigger member which is adjustable by bending the same to vary the length of the lever through which pressure of the spring is exerted on the generally transverse part of the trip arm.

References Cited
UNITED STATES PATENTS

| | | | |
|---|---|---|---|
| 263,638 | 8/1882 | Wentworth | 43—15 |
| 1,012,899 | 12/1911 | Nelson | 43—15 |
| 2,694,875 | 11/1954 | Hoffman | 43—15 |

SAMUEL KOREN, Primary Examiner

DANIEL J. LEACH, Assistant Examiner